(12) United States Patent
Zernovizky et al.

(10) Patent No.: US 7,333,604 B2
(45) Date of Patent: Feb. 19, 2008

(54) ADAPTIVE NOTIFICATION OF AN INCOMING CALL IN A MOBILE PHONE

(75) Inventors: Joshua Zernovizky, Tel Aviv (IL); Marc Van Dyke, Beit Shemesh (IL)

(73) Assignee: Infone Tech, Ltd., Kfar Saba (IL)

( * ) Notice: Subject to any disclaimer, the term of this patent is extended or adjusted under 35 U.S.C. 154(b) by 0 days.

(21) Appl. No.: 11/094,263

(22) Filed: Mar. 31, 2005

(65) Prior Publication Data

US 2006/0153358 A1 Jul. 13, 2006

Related U.S. Application Data

(60) Provisional application No. 60/642,054, filed on Jan. 10, 2005.

(51) Int. Cl.
*H04M 1/00* (2006.01)
*H04M 9/00* (2006.01)

(52) U.S. Cl. .............................. 379/392.01; 379/388.03

(58) Field of Classification Search ...................... None
See application file for complete search history.

(56) References Cited

U.S. PATENT DOCUMENTS

| | | | | |
|---|---|---|---|---|
| 5,844,983 A | * | 12/1998 | Lilja | ........................ 379/418 |
| 5,892,817 A | * | 4/1999 | Will | ....................... 379/373.01 |
| 6,134,455 A | * | 10/2000 | Corkum | .................. 379/373.01 |
| 6,408,187 B1 | * | 6/2002 | Merriam | ...................... 455/567 |
| 6,954,657 B2 | * | 10/2005 | Bork et al. | .................. 455/567 |
| 2002/0116982 A1 | | 8/2002 | Dodabalapur et al. | |
| 2002/0116983 A1 | | 8/2002 | Bao et al. | |

* cited by examiner

*Primary Examiner*—Ramnandan Singh
(74) *Attorney, Agent, or Firm*—Soquel Group LLC

(57) ABSTRACT

A device and method for handling announcement of an incoming call in a telephone handset at least in part in accordance with a measured ambient noise level is provided. In some embodiments, the disclosed device includes an audio signaling mechanism such as a ringer whose loudness is automatically adjusted in accordance with a measured ambient noise levels. Alternatively or additionally, the present invention provides an audio speaker for outputting received voice communications, wherein the loudness of the speaker is determined at least in part in accordance with a measured ambient noise level. In some embodiments, the present invention provides methods and devices for handling announcement of an incoming call at least in part in accordance with electrical output from other sensing circuits such as location sensing circuits and environmental circuits. In some embodiments, a loudness of the audio speaker for outputting received voice communications is determined at least in part in accordance with electrical output from other sensing circuits such as location sensing circuits and environmental circuits.

4 Claims, 4 Drawing Sheets

ADAPTIVE NOTIFICATION OF AN INCOMING CALL IN A MOBILE PHONE

CROSS-REFERENCE TO RELATED APPLICATIONS

This patent application claims the benefit of U.S. Provisional Patent Application No. 60/642,054, filed Jan. 10, 2005.

FIELD OF THE INVENTION

The present invention relates to telephone handsets, and in particular, to devices within telephone handsets for handling announcement of incoming calls and for outputting a received voice communication.

BACKGROUND OF THE INVENTION

Mobile phones are ubiquitous devices used by an ever-increasing body of users who exhibit tendencies to carry their mobile phones with them wherever they go. Thus, it is not uncommon for users to bring their mobile phones to many different environments, including offices, restaurants, public transportation, private vehicles, and even to lavatories.

One salient feature of mobile phones is a signaling mechanism for handling announcement of incoming calls such as a ringer or a vibration device. Proper social etiquette often requires that users lower the volume setting of their phone ringer when located in a quiet location such as a quiet office meeting room. Conversely, users often prefer a louder volume setting in a noisy setting such as a crowded train station, in order to ensure that the ringing of the device is properly heard and that an incoming call is not missed. Furthermore, in such noisy environments users sometimes prefer an additional vibration signal when an incoming call arrives.

Towards this end, most phone handsets include mechanisms for adjusting a loudness of a ringer. Some devices provide user interfaces for defining multiple signaling profiles, where each profile specifies a behavior that the ringing device and/or the vibrating device are to exhibit upon detection by the phone handset of an incoming call. A user of these devices can manually select the appropriate signaling profile in accordance with his or her immediate physical environment.

One commonly used profile is the "meeting" profile, whereby an incoming call is announced such that a user is informed without interfering with the meeting. Additional common profiles include "normal", and "outside" (extremely high volume).

Unfortunately, as users carry their mobile devices from one physical environment to another, they often forget or neglect to manually activate the appropriate signaling profile for signaling incoming calls. This can lead to undesirable consequences, such as missed incoming calls in noisy environments or embarrassing situations wherein a mobile phone generates a loud noise in quiet environment.

There is an apparent need for telephone handsets that appropriately handle announcement of incoming calls without requiring users to manually attend to device settings.

SUMMARY OF THE INVENTION

The aforementioned needs are satisfied by several aspects of the present invention.

It is now disclosed for the first time a telephone handset for transmitting a voice communication. The presently disclosed telephone handset includes a noise sensing mechanism for generating an electrical signal in accordance with a measured ambient noise level, and an incoming call signaling mechanism for handling announcement of a detected incoming call in a manner determined at least in part in accordance with the electrical signal.

According to some embodiments, the incoming call signaling mechanism includes an audio signaling mechanism whose loudness is adjusted in accordance with the electrical signal.

According to some embodiments, the incoming call signaling mechanism includes a vibration mechanism whose amplitude is adjusted in accordance with the electrical signal.

According to some embodiments, the noise sensing mechanism is operative to measure the ambient noise level upon detection of the incoming call.

According to some embodiments, the noise sensing mechanism is configured to periodically measure the ambient noise level.

According to some embodiments, the noise sensing mechanism is also used to receive the voice communication.

According to some embodiments, the incoming call signaling mechanism handles announcement of the detected incoming call in part according to a user preference selectable from a plurality of user preferences. Thus, according to some embodiments the telephone handset further includes a user interface for selecting a user preference.

According to some embodiments, the user interface allows for the selection of a mode whereupon a specific, predefined user preference is selected at least in part in accordance with the detected electrical signal indicative of the local ambient noise level. In a particular embodiment, the device is operative so that according a first selected user preference, a second user preference is selected in accordance with the electrical signal. Once the second user preference is automatically selected, the call signaling mechanism handles announcement of the detected incoming call in accordance with the automatically selected second user preference.

According to some embodiments, the presently disclosed telephone handset includes an override mechanism for overriding at least part of the mechanism whereby the incoming call signaling mechanism handles announcement of incoming calls in accordance with the electrical signal indicative of the measured ambient noise level.

According to some embodiments, the user interface provides a "complete override" user preference, whereby the incoming call signaling mechanism handles announcement of incoming calls in a manner that is insensitive to said measured ambient noise level.

According to some embodiments, the incoming call signaling mechanism includes a plurality of incoming call signaling devices. In a particular embodiment, at least one incoming call signaling device is operative to handle announcement of incoming calls only upon selection of a user preference to signal according to the measured ambient noise level.

According to some embodiments, the call signaling mechanism handles announcement in accordance with a plurality of signaling configurations. In a particular embodiment, only a subset of signaling configurations are specifiable using the user interface.

According to some embodiments, the incoming call signaling mechanism includes a ring-tone mechanism for the handling of announcement of the incoming phone call. In a particular embodiment, the ring-tone mechanism is operative to select a specific ring-tone at least in part in accordance with the electrical signal.

It is now disclosed for the first time a method of handling announcement of an incoming call in a telephone handset system. The currently disclosed method includes generating an electrical signal in accordance with an electrically measured ambient noise level, detecting the incoming call, and handling announcement of the incoming call in a manner determined at least in part by the electrical signal.

According to some embodiments, the currently disclosed method is automatic, independent of user input.

According to some embodiments, the handling announcement includes producing a sound whose loudness is in accordance with the electrical signal.

According to some embodiments, the handling announcement includes producing a mechanical vibration whose intensity is in accordance with the electrical signal.

It is now disclosed for the first time a telephone handset for receiving a transmitted voice communication. The presently disclosed handset includes a noise sensing mechanism for generating an electrical signal in accordance with a measured ambient noise level, and an audio speaker for outputting the received voice communication, wherein a loudness of the audio speaker is determined at least in part in accordance with the electrical signal.

According to some embodiments, the noise sensing mechanism is operative to measure the ambient noise level upon detection of the incoming call.

According to some embodiments, the noise sensing mechanism is configured to periodically measure the ambient noise level.

According to some embodiments, the loudness is determined in part according to a user preference selectable from a plurality of user preferences. Thus, according to some embodiments the telephone handset further includes a user interface for selecting a user preference.

According to some embodiments, the audio speaker is operative to output the received voice communication at a plurality of loudness values, and only a subset of loudness values are specifiable using said user interface.

It is now disclosed for the first time a method of outputting a transmitted voice communication in a telephone handset system including an audio speaker. The disclosed method includes generating an electrical signal in accordance with an electrically measured ambient noise level, receiving the transmitted voice communication, and outputting with the audio speaker the transmitted voice communication, wherein a loudness of the output is determined at least in part in accordance with the electrical signal.

It is now disclosed for the first time a telephone handset including a location sensing mechanism for generating an electrical signal in accordance with a sensed location of the telephone handset, and an incoming call signaling mechanism for handling announcement of a detected incoming call in a manner determined at least in part in accordance with the sensed electrical signal.

According to some embodiments, the location sensing mechanism is operative to sense the location of the telephone handset upon detection of the incoming call.

According to some embodiments, the location sensing mechanism is configured to periodically sense the location of the telephone According to some embodiments, the telephone handset further includes a housing, and both the location sensing mechanism and the incoming call signaling mechanism are located within said housing.

It is now disclosed for the first time a method of handling announcement of an incoming call in a telephone handset system. The currently disclosed method includes generating an electrical signal in accordance with an electrically measured sensed location of the telephone handset, detecting the incoming call, and handling announcement of the incoming call in a manner determined at least in part by the electrical signal.

According to some embodiments, the currently disclosed method is automatic, independent of user input.

According to some embodiments, the handling announcement includes producing a sound whose loudness is in accordance with the electrical signal.

According to some embodiments, the handling announcement includes producing a mechanical vibration whose intensity is in accordance with the electrical signal.

It is now disclosed for the first time a telephone handset including an environmental sensing mechanism for generating an electrical signal in accordance with measured local environmental conditions, and an incoming call signaling mechanism for handling announcement of a detected incoming call in a manner determined at least in part in accordance with the electrical signal.

According to some embodiments, the environmental sensing mechanism is operative to measure the local environmental conditions upon detection of the incoming call.

According to some embodiments, the environmental sensing mechanism is configured to periodically measure the local environmental conditions.

According to some embodiments, measured local environmental conditions includes a presence of a substance.

Exemplary substances that can be detected by the environmental sensing mechanism include but are not limited to odorous substances and water vapor.

In some embodiments, the environmental sensing mechanism is operative to measure at least one condition selected from the group consisting of a local wind speed, a local relative humidity, a local barometric pressure, a local dew point, and a local windchill.

These and further embodiments will be apparent from the detailed description and examples that follow.

DETAILED DESCRIPTION OF THE INVENTION

Figure 1:
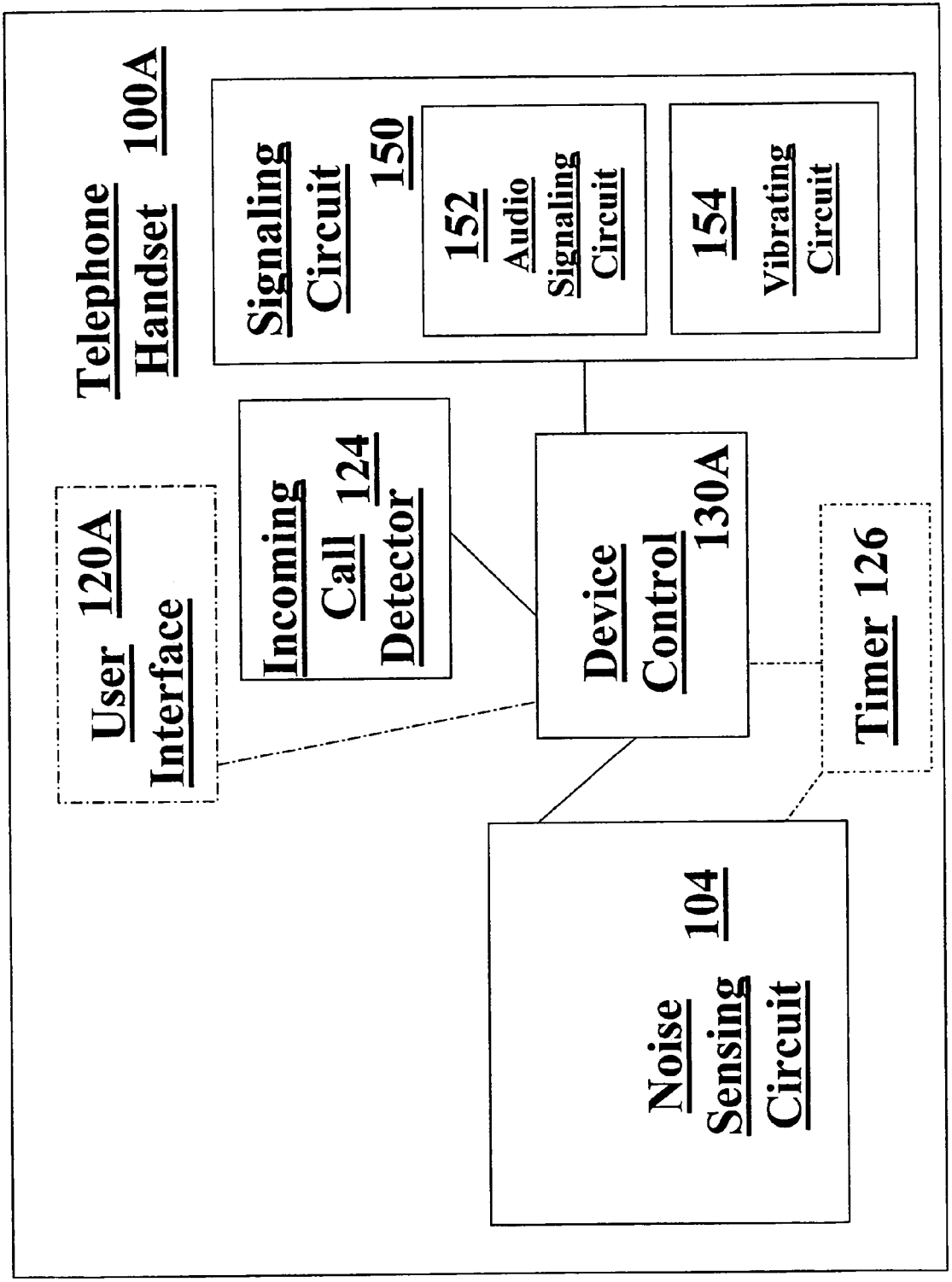
FIG. 1 provides a block diagram of telephone handsets wherein a signaling circuit handles announcement of an incoming call at least in part in accordance with a measured ambient noise level.

Referring now to the drawings, FIG. 1 provides a block diagram of an exemplary telephone handset 100A or transceiver device such as a cellular telephone, a PDA phone, a portable telephone, or a conventional telephone. The telephone handset 100A or transceiver device is operative to transmit and receive voice communications. The telephone handset 100A includes a noise sensing mechanism 104 such as a microphone or piezoelectric sensor, an incoming call detector 124, and at least one signaling circuit 150 for announcing a detected incoming call.

As illustrated in FIG. 1, the telephone handset includes a device control 130A operative to instruct at least one signaling circuit 150 to handle announcement of the incoming call in accordance with a signaling profile. In different embodiments, the device control 130A is implemented as electronic circuitry, software, or a combination thereof. Exemplary signaling circuits include audio signaling devices 152 such as an electronic ringer, and vibration devices 154.

Each signaling profile is composed of at least one signaling configuration, and each signaling configuration provides an instruction to at least one signaling circuit 150 describing how to handle announcement of an incoming call. Thus, each signaling profile provides one or more of instructions to the signaling circuits 150.

One simple example of a signaling configuration is a ringer loudness. Other examples of signaling configurations include but are not limited to specific ring-tones for announcing the incoming call, an intensity of a vibration mechanism, or instructions specifying how to signal the call using a combination of signaling devices. Thus, one specific example of a signaling profile is a set of instructions to announce an incoming call using a specific ringtone at a designated loudness.

It is noted that in some embodiments, signaling configurations and signaling profiles are stored in memory (not shown) of the device, though this is not a specific requirement of the present invention. Alternatively or additionally, the device provides a mechanism for deriving signaling configurations and signaling profiles.

The noise sensing mechanism 104 measures the ambient noise level and produces an electrical signal indicative of measured noise level. In some embodiments, the noise sensing circuit 104 includes an A/D converter. The device control 130A detects the electric signal outputted from the noise sensing mechanism 104 as well as output from the incoming call detector 124.

Upon receiving an indication of an incoming call from the incoming call detector 124, the device control 130A instructs at least one signaling circuit 150 to handle announcement of the call in accordance with a signaling profile selected in accordance with the electrical signal outputted from the noise sensing circuit 104. Thus, the mechanism whereby the signaling circuit 150 handles announcement of the incoming call at least in part in accordance with a measured ambient noise level is operative automatically, independent of user intervention.

In some embodiments, the noise sensing mechanism 104 includes the microphone used by the telephone handset for receiving voice communications to be transmitted by the device.

In an exemplary embodiment, the device control 130A instructs the audio signaling circuit 152 to signal the incoming call with a loudness that increases as the measured ambient noise level increases. In some embodiments, the loudness is zero for certain ambient noise levels, and the audio signaling circuit 152 does not announce the incoming call.

Alternately or additionally, the device control 130A instructs the vibration mechanism 154 to vibrate with an amplitude that increases as the measured ambient noise level increases. In some embodiments, the amplitude is exactly zero for certain ambient noise levels, and the vibration mechanism 154 does not vibrate to announce the incoming call.

In some embodiments, the noise sensing circuit 104 measures the ambient noise level at periodic time intervals in accordance with output from an optional timer 126.

In some embodiments, the noise sensing circuit 104 measures the ambient noise level upon receiving instructions from the device control 130A. In a particular embodiment, this feature is implemented such that upon detection of an incoming call by the incoming call detector 124, the device control 130A instructs the noise sensing circuit 104 to measure the ambient noise level.

Optionally, the telephone handset 100A includes a user interface 120A for receiving user preferences or user preference profiles. In some embodiments, a signaling profile instructing the signaling circuit 150 how to handle announcement of a specific incoming call is derived and/or retrieved from memory in part in accordance with user preferences received through user interface 120A.

In some embodiments, the user interface 120A provides an optional override mode, and upon activation of the override mode the device control 130A instructs at least one signaling circuit 150 to handle announcement of incoming calls only in accordance with received user preferences in a manner that is insensitive to the ambient noise level.

In some embodiments, the user interface 120A provides for selection of a "combination" mode. According to these combination modes, a signaling profile is derived and/or retrieved from memory in accordance with both a selected user preference or preference profile as well as the electrical output of the noise sensing mechanism 104. One example is where a specific ring-tone is selected in accordance with the calling party, while the loudness of the ring-tone is determined by the ambient noise measured by the noise sensing mechanism 104. In another example, the loudness of the audio signaling mechanism 152 is determined both by a loudness user preference as well as the ambient noise level as measured by the noise sensing mechanism 104.

In some embodiments, certain signaling configurations cannot be specified through user interface 120A, and are provided at least in part in accordance with the ambient noise measured by the noise sensing mechanism 104. One example is loudness of an audio signaling circuit 152 such as a ringer. In some embodiments, the user interface 120A allows the user to select a loudness from a plurality of discrete loudness settings. In some embodiments, the user interface 120A provides a limited number of loudness settings, such as at most 10, so as not to overburden the user with a multiplicity of options. Thus, according to this example, certain intermediate values of ringer loudness level levels, not specifiable through the user interface, are now provided in accordance with a measured ambient noise level. It is noted that this adaptive mechanism thus works in smaller steps, yielding a smoother operation. Instead of having only a few possible signaling configurations for loudness of a ringing device, the phone can now effectively in certain embodiments provide many more loudness settings, only slightly differing from each other in accordance with subtle changes in the ambient noise level. In a particular embodiment, the device provides an infinite number of ringer loudness values in accordance with an analog signal received from noise sensing circuit 104.

In some embodiments, the control device 130A is configurable to instruct the signaling circuit 150 to handle announcement of the incoming call in accordance with a specific user profile selected from the plurality of pre-defined user profiles. The selection of the specific user profile is carried out at least in part in accordance with the ambient noise level as measured by the noise sensing mechanism 104.

In one example, each pre-defined user profile specifies a different ring tone. According to this example, the device control 130A instructs the audio signaling mechanism 152 to announce detected incoming calls according to one specific ring tone selected in accordance with the measured ambient noise as indicated by the output of the noise sensing mechanism 104.

Figure 2:
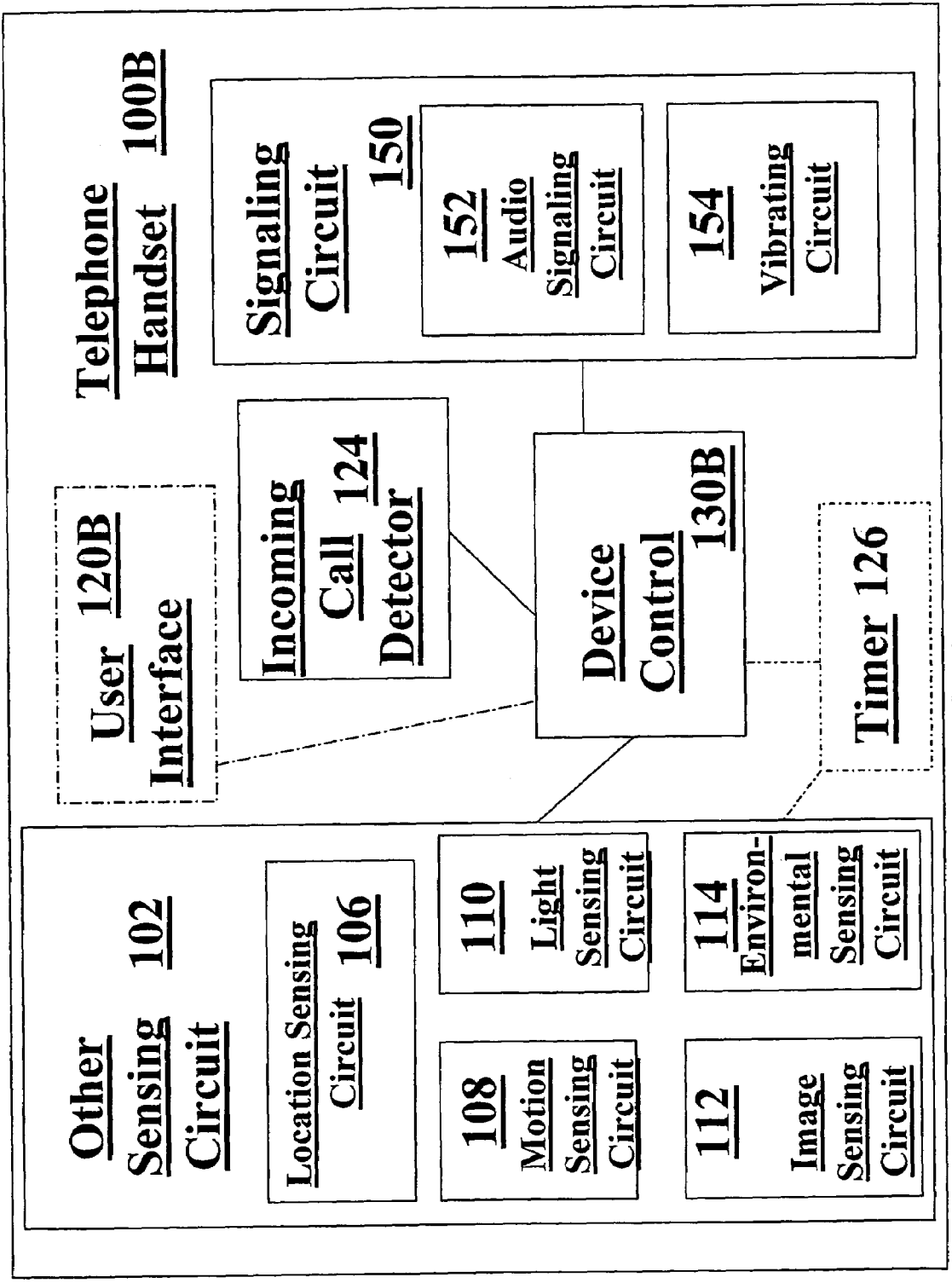
FIG. 2 provides a block diagram of telephone handsets wherein a signaling circuit handles announcement of an incoming call at least in part in accordance with an electrical signal from a sensing circuit.

FIG. 2 is a block diagram of telephone handsets that provide Other Sensing Circuits 102. Device control 130B instructs at least one signaling circuit 150 to handle announcement of the call in accordance with a signaling profile selected in accordance with the electrical signal outputted from one or more of the other sensing circuits 102. Upon detection of an incoming call with the incoming call detector 124, the signaling circuit 150 handles announcement of the call according to the selected signaling profile.

Thus, the mechanism whereby the signaling circuit 150 handles announcement of the incoming call at least in part in accordance with a measured output from at least one of the other signaling circuits 102 is operative automatically, independent of user intervention.

In some embodiments, the other sensing circuit 102 is operative to effect a measurement at periodic time intervals in accordance with output from an optional timer 126.

In some embodiments, the other sensing circuit 102 is operative to effect a measurement upon detection of an incoming call.

One exemplary signaling circuit 102 is a location sensing circuit 106 such as a GPS sensor or a device that senses location by triangulation from base stations. In one example, when the device senses that a user is located in a train station, a signaling profile for a loud ringing and a strong vibration indication of an incoming call is automatically selected by the device control 130B at least in part in accordance with an electrical signal received from the location sensing circuit 106. In another example, a telephone handset 100B belonging to an attorney is programmed so that the device control 130B automatically selects a signaling profile for quiet ringing when the location sensing circuit 106 indicates that the telephone handset 100B is located in the vicinity of a courthouse.

One exemplary signaling circuit 102 is a motion sensing circuit 106 such as the motion sensing circuit provided in certain GPS devices. In one example, a signaling profile for a loud ringing and a strong vibration is automatically selected by the device control 130B when the motion sensing circuit 108 indicates that the device is traveling in a fast moving car.

One exemplary signaling circuit is a light sensing circuit 110 such as those provided in telephone handsets with digital cameras. In one example, a signaling profile for a quiet ringing is automatically selected by the device control 130B when the light sensing circuit 110 indicates that the device is in a dark room such as a dark bedroom or a movie theater.

One exemplary signaling circuit is an image sensing circuit 112 such as those provided in telephone handsets with digital cameras. In one example, it is desired to have quiet ringing in a certain room characterized by specific visual features. According to this example, a signaling profile for a quiet ringing is automatically selected by the device control 130B when the image sensing circuit 112 outputs an electrical signal indicating that the specific visual features have been detected.

One exemplary signaling circuit is an environmental sensing circuit 114 for measuring local environmental conditions such as the presence of a substance. In one example, a loud ringer is desired in outdoor conditions, while a quieter ringer is preferred in indoor conditions. The environmental sensing circuit 114 is thus operative to measure at least one of a local wind speed, a local relative humidity, a local barometric pressure, a local dew point, and a local windchill, and to output an electrical signal indicative of a least one of these parameters. The control device 130B selects the appropriate signaling profile at least in part in accordance with the electrical signal outputted by the environmental sensing circuit.

In another example, the presence of a substance such as water vapor is indicative of whether or not the device is outdoors, and the environmental sensing circuit 114 is operative to measure the presence of water vapor.

In another example, it is desired to turn down the volume of the ringer or even to mute the ringer device while a user is located in a lavatory characterized by odors. Electronic devices for detecting the presence of odors are well known in the art, and the skilled practitioner is directed, for example, to U.S. Published Patent Applications 2002/0116982 and 2002/0116983. According to this example, the environmental sensing circuit 114 includes a mechanism for detecting the presence of an odorous substance.

Figure 3:
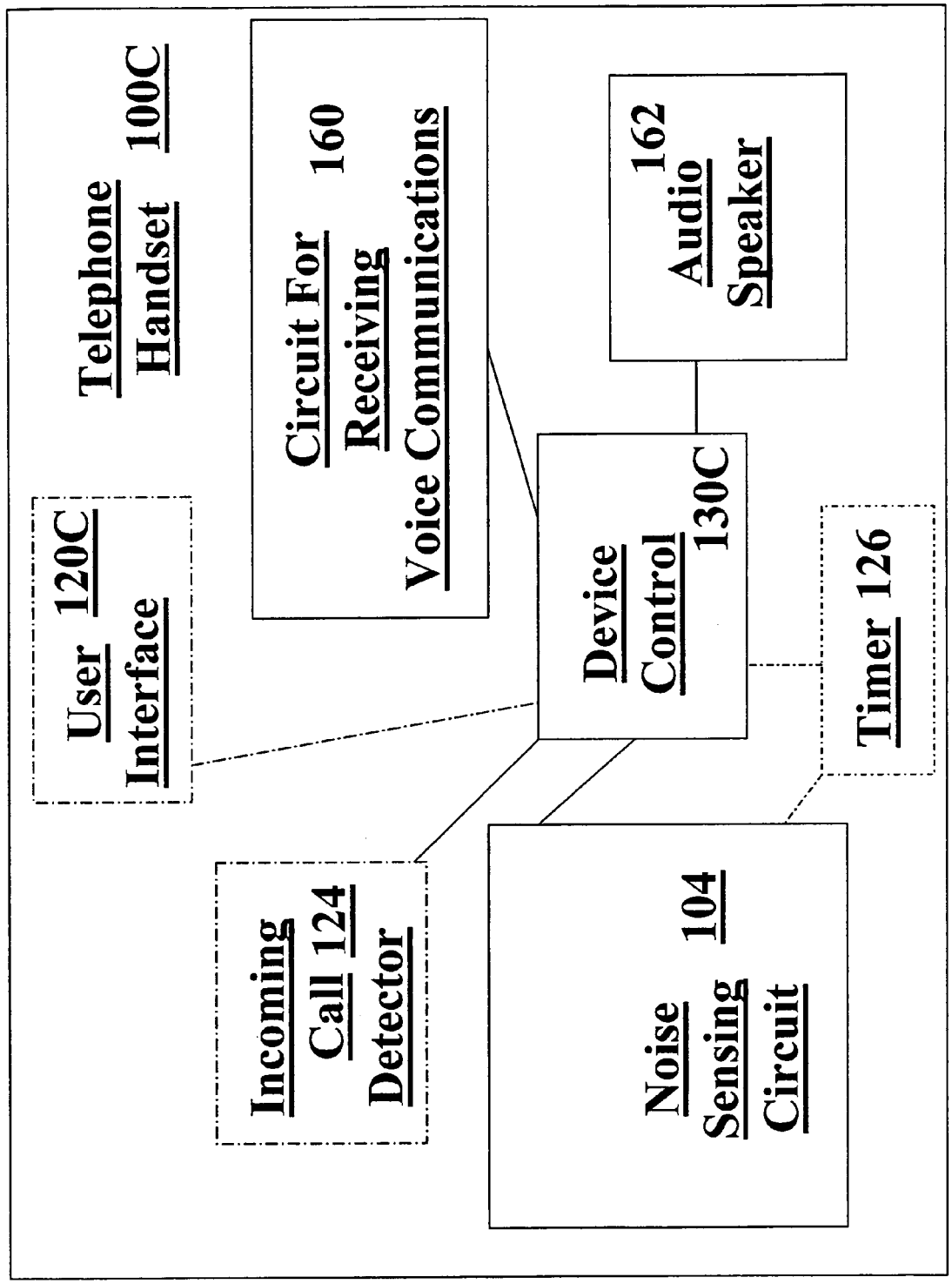
FIG. 3 provides a block diagram of telephone handsets wherein an audio speaker outputs a received voice communication with a loudness determined at least in part in accordance with a measured ambient noise level.

FIG. 3 is a block diagram of telephone handsets that provide a mechanism for automatically adjusting a loudness of an audio speaker 162 for outputting a received voice communication in accordance with an electrically measured ambient noise level. This mechanism is operative independent of user intervention.

As illustrated in FIG. 3, the transmitted voice communication is received by the circuit for receiving voice communications 160. In some embodiments, this circuit for receiving voice communication 160 includes a radio receiver device.

In a noisy local environment, it is often desired to increase the loudness of the audio speaker 162 for outputting received transmitted voice communications to help ensure that the user can properly hear the voice communications. Embodiments of the present invention described in FIG. 3 free the user from the burden of manually adjusting the volume of the audio speaker in these situations. In embodiments wherein the ambient noise level is measured upon detection of the incoming call or earlier, the volume of the audio speaker 162 can be appropriately adjusted before a telephone conversation even begins.

Optionally, the telephone handset 100C includes a timer, and the ambient noise level is measured periodically.

Optionally, the telephone includes a user interface 120C allows the user to select a loudness of audio speaker 162 from a plurality of discrete loudness settings. In some embodiments, the user interface 120C provides a limited number of loudness settings, such as at most 10, so as not to overburden the user with a multiplicity of options. Thus, according to this example, certain intermediate values of audio speaker 162 loudness, not specifiable through the user interface, are now provided in accordance with a measured ambient noise level. It is noted that this adaptive mechanism thus works in smaller steps, yielding a smoother operation. In a particular embodiment, the device provides an infinite number of audio speaker 162 loudness values in accordance with an analog signal received from noise sensing circuit 104.

Figure 4:
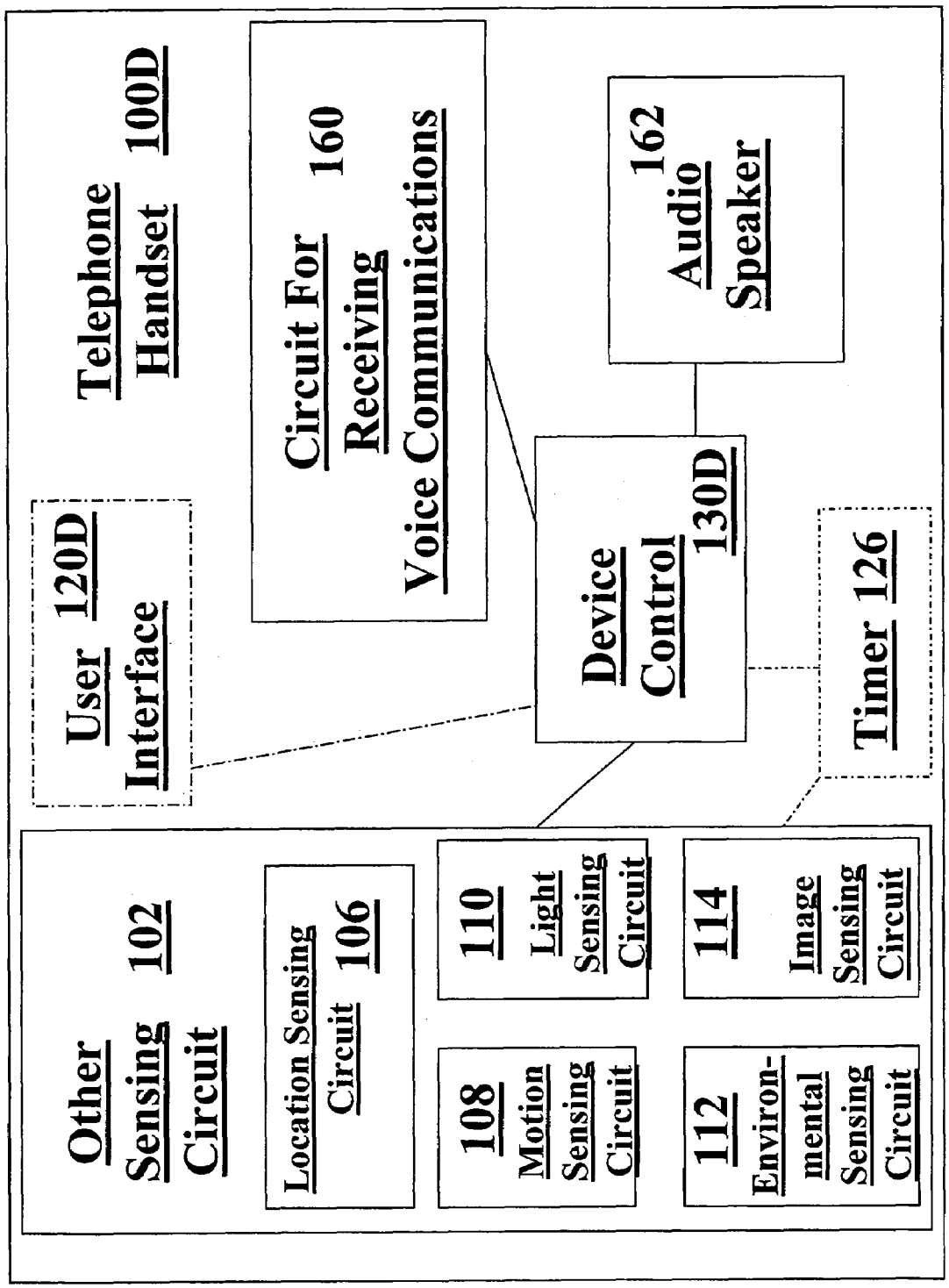
FIG. 4 provides a block diagram of telephone handsets wherein an audio speaker outputs a received voice communication with a loudness determined at least in part in accordance with an electrical signal from a sensing circuit.

FIG. 4 is a block diagram of telephone handset 100D provided by certain embodiments of the present invention wherein a loudness of the audio speaker 162 is automatically adjusted at least in part in accordance with an electrical signal outputted from Other Sensing Circuits 102.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

What is claimed is:

1. A telephone handset for transmitting a voice communication comprising:
    a) a noise sensing mechanism housed within a telephone handset for generating a first electrical signal in accordance with a measured ambient noise level at a location where the telephone handset is situated;
    b) an environment sensing mechanism housed within the telephone handset for generating a second electrical signal in accordance with presence of a substance in the air at the location where the telephone handset is situated; and
    c) an incoming call signaling mechanism coupled with said noise sensing mechanism and with said environment sensing mechanism for handling announcement of a detected incoming call in a manner determined in accordance with said first and said second electrical signal.

2. The telephone handset of claim 1 wherein said environment sensing mechanism senses the presence of water vapor in the air.

3. A telephone handset for transmitting a voice communication comprising:
    a) a noise sensing mechanism housed within a telephone handset for generating a first electrical signal in accordance with a measured ambient noise level at a location where the telephone handset is situated;
    b) an environment sensing mechanism housed within the telephone handset for generating a second electrical signal in accordance with presence of an odor in the air at the location where the telephone handset is situated; and
    c) an incoming call signaling mechanism coupled with said noise sensing mechanism and with said environment sensing mechanism for handling announcement of a detected incoming call in a manner determined in accordance with said first and said second electrical signal.

4. A telephone handset for transmitting a voice communication comprising:
    a) a noise sensing mechanism housed within a telephone handset for generating a first electrical signal in accordance with a measured ambient noise level at a location where the telephone handset is situated;
    b) an environment sensing mechanism housed within the telephone handset for generating a second electrical signal in accordance with at least one of the set consisting of (i) wind speed, (ii) humidity, (iii) barometric pressure, (iv) dew point, and (v) wind chill, at the location where the telephone handset is situated; and
    c) an incoming call signaling mechanism coupled with said noise sensing mechanism and with said environment sensing mechanism for handling announcement of a detected incoming call in a manner determined in accordance with said first and said second electrical signal.

* * * * *